United States Patent
Beyer et al.

(10) Patent No.: US 8,145,471 B2
(45) Date of Patent: Mar. 27, 2012

(54) NON-DESTRUCTIVE SIMULATION OF A FAILURE IN A VIRTUALIZATION ENVIRONMENT

(75) Inventors: Duane K. Beyer, Poughkeepsie, NY (US); Eli M. Dow, Poughkeepsie, NY (US); Frank R. LeFevre, Poughkeepsie, NY (US)

(73) Assignee: International Business Machines Corporation, Armonk, NY (US)

( * ) Notice: Subject to any disclaimer, the term of this patent is extended or adjusted under 35 U.S.C. 154(b) by 491 days.

(21) Appl. No.: 12/112,280

(22) Filed: Apr. 30, 2008

(65) Prior Publication Data

US 2009/0276200 A1   Nov. 5, 2009

(51) Int. Cl.
*G06F 9/445* (2006.01)
*G06F 9/30* (2006.01)

(52) U.S. Cl. ............ 703/26; 703/27; 717/131; 712/228; 726/11

(58) Field of Classification Search ................. 703/2, 14, 703/17, 5, 26, 27; 712/228; 726/11; 714/15; 717/131
See application file for complete search history.

(56) References Cited

U.S. PATENT DOCUMENTS

| | | | |
|---|---|---|---|
| 4,674,038 A * | 6/1987 | Brelsford et al. | 714/15 |
| 6,223,202 B1 | 4/2001 | Bayeh | |
| 6,530,078 B1 | 3/2003 | Shmid et al. | |
| 6,772,419 B1 | 8/2004 | Sekiguchi et al. | |
| 2005/0060590 A1 | 3/2005 | Bradley et al. | |
| 2006/0015869 A1 * | 1/2006 | Neiger et al. | 718/1 |
| 2007/0006175 A1 * | 1/2007 | Durham et al. | 717/131 |
| 2007/0006226 A1 | 1/2007 | Hendel | |
| 2007/0192765 A1 | 8/2007 | Shimogawa et al. | |
| 2007/0204265 A1 | 8/2007 | Oshins | |
| 2007/0250833 A1 | 10/2007 | Araujo, Jr. et al. | |
| 2007/0253436 A1 | 11/2007 | Henry et al. | |
| 2007/0271561 A1 | 11/2007 | Winner et al. | |
| 2007/0271610 A1 | 11/2007 | Grobman | |
| 2009/0172369 A1 * | 7/2009 | Stillwell et al. | 712/228 |
| 2010/0146615 A1 * | 6/2010 | Locasto et al. | 726/11 |

* cited by examiner

*Primary Examiner* — Thai Phan
(74) *Attorney, Agent, or Firm* — Cantor Colburn LLP; Steven Chiu

(57) ABSTRACT

A method for simulating a hardware failure in a virtualization environment includes determining a location of an instruction pointer for a particular operating system operating in the virtualization environment; determining an address of a memory location containing an invalid instruction; and writing the address of the memory location containing the invalid instruction in the location of the instruction pointer.

14 Claims, 3 Drawing Sheets

NON-DESTRUCTIVE SIMULATION OF A FAILURE IN A VIRTUALIZATION ENVIRONMENT

BACKGROUND OF THE INVENTION

The present disclosure relates generally to computer systems and, in particular, to simulating a failure in a virtualization environment.

A shared computer system often concurrently supports a number of different guest operating systems by using virtual machines. Virtual machines can be in the form of virtual machine guests, logical partitions (LPARs), or other isolation techniques.

Virtual machines (VM's) are separated in two major categories based on their use and degree of correspondence to any real machine. A system virtual machine provides a complete system platform which supports the execution of a complete operating system (OS). In contrast, a process virtual machine is designed to run a single program, which means that it supports a single process. An essential characteristic of a virtual machine is that the software running inside is limited to the resources and abstractions provided by the virtual machine—it cannot break out of its virtual world.

System virtual machines (sometimes called hardware virtual machines) allow multiplexing the underlying physical machine between different virtual machines, each running its own operating system. The software layer providing the virtualization is called a virtual machine monitor or hypervisor. A hypervisor can run on bare hardware (Type 1 or native VM) or on top of an operating system (Type 2 or hosted VM). The main advantages of system VMs are that multiple OS environments can co-exist on the same computer, in strong isolation from each other, and the virtual machine can provide an instruction set architecture (ISA) that is somewhat different from that of the real machine.

Multiple VMs each running their own operating system (called a guest operating system) are frequently used in server consolidation, where different services that used to run on individual machines in order to avoid interference, are instead run in separate VMs on the same physical machine. This use is frequently called quality-of-service isolation (QoS isolation). The desire to run multiple operating systems was the original motivation for virtual machines, as it allowed time-sharing a single computer between several single-tasking operating systems.

A shared computer system may also employ other containers executing discrete and unrelated tasks. In such a collaborative shared-physical-resource environment, testing and workloads can be disrupted in non-obvious ways during development on a shared computer system.

In some instances, two mainframe or other computers may be monitoring one another. If one mainframe determines that it or the other mainframe is about to crash, system designers have attempted to develop elegant load shifting techniques to ensure that processsing is not too adversely affected if one of the mainframes goes down. Like any development, these techniques have created additional challenges.

BRIEF SUMMARY OF THE INVENTION

One embodiment of the present invention is directed to a method for simulating a hardware failure in a virtualization environment. The method of this embodiment includes determining a location of an instruction pointer for a particular operating system operating in the virtualization environment; determining an address of a memory location containing an invalid instruction; and writing the address of the memory location containing the invalid instruction in the location of the instruction pointer.

Another embodiment of the present invention is directed to a method for testing a partitionable computer simulating a hardware failure in a virtualization environment. The method of this embodiment includes partitioning the computer into one or more virtual machines including a first virtual machine; determining the operating system installed on the first virtual machine; determining a location of an instruction pointer for the operating system operating on the first virtual machine; determining an address of a memory location containing an invalid instruction for the operating system on the first virtual machine; and writing the address of the memory location containing the invalid instruction in the location of the instruction pointer.

Other systems, methods, and/or computer program products according to embodiments will be or become apparent to one with skill in the art upon review of the following drawings and detailed description. It is intended that all such additional systems, methods, and/or computer program products be included within this description, be within the scope of the present invention, and be protected by the accompanying claims.

BRIEF DESCRIPTION OF THE DRAWINGS

The subject matter which is regarded as the invention is particularly pointed out and distinctly claimed in the claims at the conclusion of the specification. The foregoing and other objects, features, and advantages of the invention are apparent from the following detailed description taken in conjunction with the accompanying drawings in which:

Figure 1:
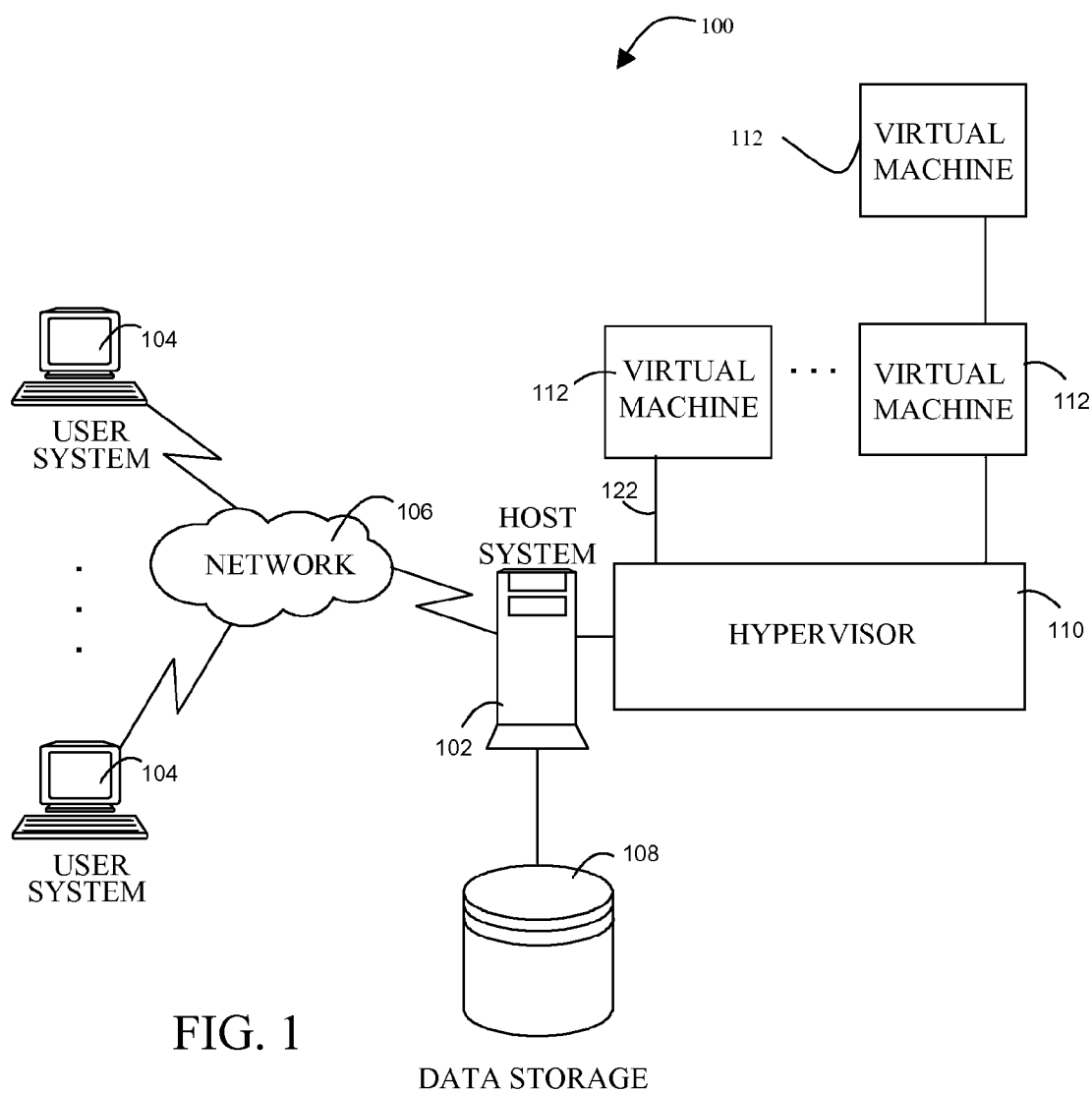
FIG. 1 depicts a system on which a simulated failure according to the present invention may be implemented.

The detailed description explains the preferred embodiments of the invention, together with advantages and features, by way of example with reference to the drawings.

DETAILED DESCRIPTION OF THE INVENTION

One problem that has emerged due to the design of elegant failure procedures is that testing a system for an operating system or power failure without affecting other virtual machines is difficult. For instance, in the case where two mainframe computer are sharing processing and employing a load-leveler to allocate processing between the two mainframes, it is difficult to simulate a power failure, and therefore, the ability to quickly transfer the load from one mainframe to the other, without affecting all of the other virtual machines. That is, it is difficult to test "pulling the plug" without actually pulling the plug on the mainframe and taking the entire mainframe down and, thus, disturbing the usage of all of the mainframe's users.

Exemplary embodiments of the present invention provide methods for causing a virtual computer to simulate a hardware or software failure. In one embodiment, the location of a program counter is determined. As is well known in the art, the program counter (also called the instruction pointer) is a register in a computer processor which indicates where the computer is in its instruction sequence. Depending on the details of the particular machine, the instruction pointer holds either the address of the instruction being executed, or the address of the next instruction to be executed. The instruction counter is automatically incremented for each instruction cycle so that instructions are normally retrieved sequentially from memory. Certain instructions, such as branches and subroutine calls and returns, interrupt the sequence by placing a new value in the program counter.

In most processors, the instruction pointer is incremented immediately after fetching a program instruction. This means that the target address of a branch instruction is obtained by adding the branch instruction's operand to the address of the next instruction (byte or word, depending on the computer type) after the branch instruction. The address of the next instruction to be executed is typically found in the instruction pointer. In some embodiments, an address that has an invalid instruction (also referred to herein as an invalid memory location) is determined. As is well known in the art, in some systems it may be possible to insert the invalid instruction by either user or computer intervention. Regardless, according to an embodiment of the present invention, the location of the invalid instruction is placed into the instruction pointer. Upon the next instruction cycle, the instruction pointer causes the virtual computer to try an perform the invalid instruction. In some instances the virtual computer stops operating at this point. The operation stoppage is an effective simulation of pulling the plug and may also simulate and operating system failure. In addition, operating in such a manner may effectively avoid the built-in recovery routines.

Turning now to the drawings, it will be seen that in FIG. 1 there is a block diagram of a system 100 upon which a method according to the present invention may be implemented. The system 100 of FIG. 1 includes a host system 102 in communication with user systems 104 over a network 106. In exemplary embodiments, the host system 102 is a high-speed processing device (e.g., a mainframe computer) including at least one processing circuit (e.g., a CPU) capable of reading and executing instructions, and handling numerous interaction requests from the user systems 104 as a shared physical resource. The host system 102 may function as a development and system-testing platform for developing, integrating, and testing various hardware and/or software combinations. The host system 102 can also run other applications, and may serve as a Web server, applications server, and/or a database server. In exemplary embodiments, the user systems 104 comprise desktop, laptop, or general-purpose computer devices that provide an interface for communicating with the host system 102.

Users can initiate various tasks on the host system 102 via the user systems 104, such as developing and executing system tests or running application programs. In some embodiments, the user system may be able to directly insert (via a keyboard or other input device) addresses or commands directly into the instruction pointer of a virtual machine. While only a single host system 102 is shown in FIG. 1, it will be understood that multiple host systems can be implemented, each in communication with one another via direct coupling or via one or more networks. For example, multiple host systems may be interconnected through a distributed network architecture. The single host system 102 may also represent a cluster of hosts collectively performing processes as described in greater detail herein.

The network 106 may be any type of communications network known in the art. For example, the network 106 may be an intranet, extranet, or an internetwork, such as the Internet, or a combination thereof. The network 106 can include wireless, wired, and/or fiber optic links.

In exemplary embodiments, the host system 102 accesses and stores data in a data storage device 108. The data storage device 108 refers to any type of storage and may comprise a secondary storage element, e.g., hard disk drive, tape, or a storage subsystem that is internal or external to the host system 102. Types of data that may be stored in the data storage device 108 include, for example, log files and databases. It will be understood that the data storage device 108 shown in FIG. 1 is provided for purposes of simplification and ease of explanation and is not to be construed as limiting in scope. To the contrary, there may be multiple data storage devices 108 utilized by the host system 102.

In exemplary embodiments, the host system 102 executes various applications, including a hypervisor 110 and optionally multiple virtual machines 112. In some embodiments, the system may include multiple hypervisors 110. In such embodiments, one hypervisor ma control another hypervisor to create a multi-tiered system. The hypervisor 110 manages access to resources of the host system 102 and serves as a virtual machine monitor to support concurrent execution of the virtual machines 112. Each virtual machine 112 can support specific guest operating systems and multiple user sessions for executing software written to target the guest operating systems. For example, one virtual machine 112 may support an instance of the Linux® operating system, while a second virtual machine 112 executes an instance of the z/OS® operating system. Other guest operating systems known in the art can also be supported by the hypervisor 110 through the virtual machines 112, In some embodiments, one of the virtual machines 112 could function as a hypervisor, thus resulting in a multi-tiered hypervisor structure. In exemplary embodiments, the hypervisor 110 manages execution control of each virtual machine 112 through a virtual machine control bus 122. Each virtual machine control bus 122 may handle an exchange of low-level control information, such as interrupts, device driver commands, device driver data, and the like. While each virtual machine control bus 122 can handle low-level information exchange, it is incapable of handling higher-level messages targeted for in-band user display.

Figure 2:
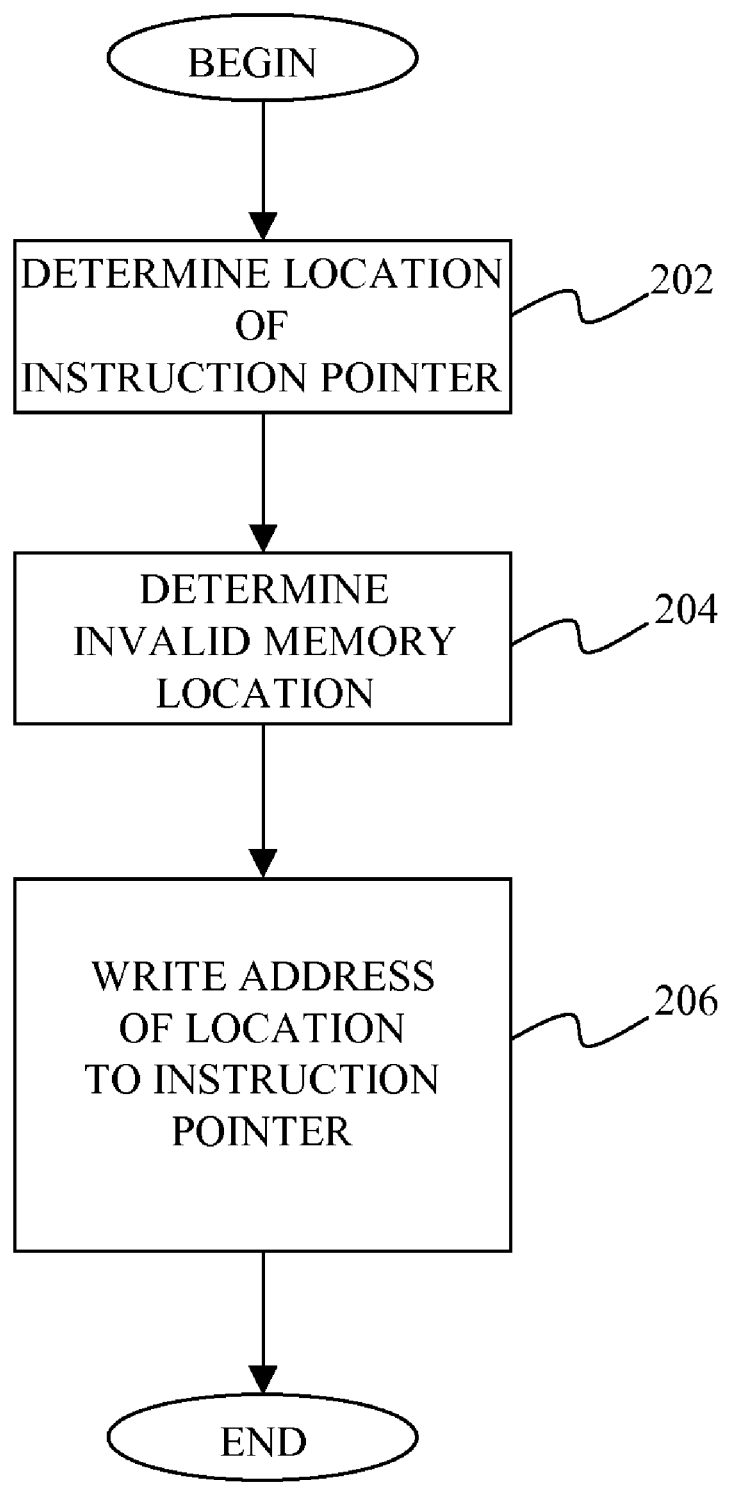
FIG. 2 shows a method for simulating a hardware failure in a virtualization environment according to one embodiment of the present invention.

FIG. 2 shows a method for simulating a hardware failure in a virtualization environment according to one embodiment of the present invention. In a block 202 a location of the instruction pointer is located. As discussed above, the location of the instruction pointer may vary depending upon the operating system that is running on a particular virtual machine. If the operating system is Linux based, a system.map file exists that contains a listing the addresses for each portion of the operating system. In particular, the system.map file contains the addresses of in kernel functions and structures and can be used to calculate or look up appropriate addresses for use. In other systems, such as the IBM z/system, the instruction pointer is referred to as the process status word.

In a block 204 an invalid memory location (or location of an invalid instruction) is determined. In some systems, such as a Linux operating system, the invalid memory location may be, for example, represented as a negative one or a null. Regardless, in a block 206, the invalid memory location is written to the instruction pointer. On the next instruction cycle, the machine stops. The stopping of the machine in this manner may simulate a power failure or an operating system failure.

Advantageously, stopping the virtual machine in this manner may be done without affecting any other virtual machines operating on a host machine (such as a mainframe) being tested, assuming the virtual machine is not itself a hypervisor with its own guests. As discussed above, if the machine has been portioned into two or more virtual machines (either in hardware, software, or a combination or both) each virtual machine may operate independently. If the virtual machines are operating independently, a failure in one virtual machine will not effect operation of another virtual machine. Thus, the present invention may allow a virtual machine to be failed for testing or other purposes without affecting other users of the host machine. For example, the virtual machine could be stopped utilizing the method disclosed herein to simulate a power failure to the host machine without affecting any other users of the host machine.

Figure 3:
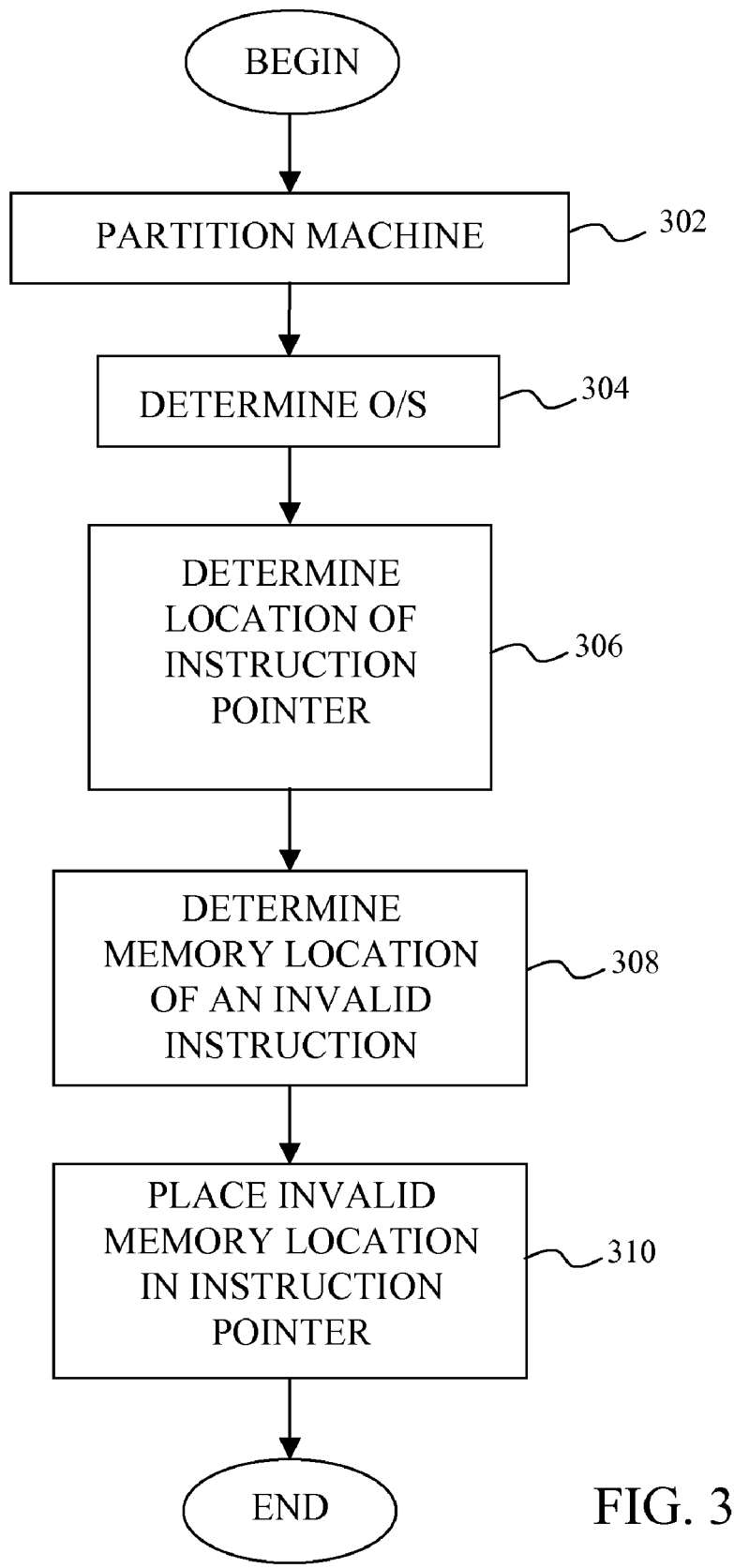
FIG. 3 shows a method for testing a partitionable computer simulating a hardware failure in a virtualization environment according to one embodiment of the present invention.

FIG. 3 shows a method for testing a partitionable computer simulating a hardware failure in a virtualization environment according to one embodiment of the present invention. At a block 302 a host machined is partitioned. As one of ordinary skill in the art will readily realize, the partitioning may be done in hardware, software, or a combination of both. Furthermore, partitioning of a machine creates a "virtualization environment." A "virtualization environment," as that term is used herein, shall refer to an environment within a host system where the host system has been partitioned.

At a block 304 the operating system of one or more of the virtual machines is determined. As discussed above, each virtual machine may run its own operating system. In some embodiments, the determination of the operating system may be made by a program running on the host machine or may be determined by a user. Regardless, at a block 306 a location of the instruction pointer for the operating running on a particular virtual machine is determined.

At a block 308 an address or memory location of an invalid instruction is determined and this address of memory location is placed in the instruction at a block 310.

As described above, embodiments can be embodied in the form of computer-implemented processes and apparatuses for practicing those processes. In exemplary embodiments, the invention is embodied in computer program code executed by one or more network elements. Embodiments include computer program code containing instructions embodied in tangible media, such as floppy diskettes, CD-ROMs, hard drives, universal serial bus (USB) flash drives, or any other computer-readable storage medium, wherein, when the computer program code is loaded into and executed by a computer, the computer becomes an apparatus for practicing the invention. Embodiments include computer program code, for example, whether stored in a storage medium, loaded into and/or executed by a computer, or transmitted over some transmission medium, such as over electrical wiring or cabling, through fiber optics, or via electromagnetic radiation, wherein, when the computer program code is loaded into and executed by a computer, the computer becomes an apparatus for practicing the invention. When implemented on a general-purpose microprocessor, the computer program code segments configure the microprocessor to create specific logic circuits.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims. Moreover, the use of the terms first, second, etc. do not denote any order or importance, but rather the terms first, second, etc. are used to distinguish one element from another. Furthermore, the use of the terms a, an, etc. do not denote a limitation of quantity, but rather denote the presence of at least one of the referenced item.

The invention claimed is:

1. A method for simulating a hardware failure in a virtualization environment, the method comprising:
   determining a location of an instruction pointer for a particular operating system operating in the virtualization environment;
   determining an address of a memory location containing an invalid instruction;
   receiving a request to fail the virtualization environment from a user system; and
   writing, based on and after receiving the request to fail the address of the memory location containing the invalid instruction to the location of the instruction pointer;
   wherein after writing and as a result thereof the virtualization environment stops operating.

2. The method of claim 1, wherein the virtualization environment is created on a mainframe computer.

3. The method of claim 1, wherein the hardware failure is a power failure.

4. The method of claim 1, wherein the location of the instruction pointer is the location of a process status word.

5. The method of claim 1, wherein the address of the memory location containing the invalid instruction is the represented by a null value.

6. The method of claim 1, wherein the address of the memory location containing the invalid instruction is the represented by a value of negative one.

7. The method of claim 1, further comprising receiving the address of the memory location containing the invalid instruction from an external terminal.

8. A method for testing a partitionable computer simulating a hardware failure in a virtualization environment, the method comprising:
   partitioning the computer into one or more virtual machines including a first virtual machine;
   determining the operating system installed on the first virtual machine;
   determining a location of an instruction pointer for the operating system operating on the first virtual machine;
   determining an address of a memory location containing an invalid instruction for the operating system on the first virtual machine;
   receiving a request to fail the virtualization environment from a user system; and
   writing, based on and after receiving the request to fail, the address of the memory location containing the invalid instruction to the location of the instruction pointer;
   wherein after writing and as a result thereof the virtualization environment stops operating.

9. The method of claim 8, wherein the virtualization environment is created on a mainframe computer.

10. The method of claim 8, wherein the hardware failure is a power failure.

11. The method of claim 8, wherein the location of the instruction pointer is the location of a process status word.

12. The method of claim 11, wherein the address of the memory location containing the invalid instruction is the represented by a null value.

13. The method of claim 11, wherein the address of the memory location containing the invalid instruction is the represented by a value of negative one.

14. The method of claim 8, further comprising receiving the address of the memory location containing the invalid instruction from an external terminal.

\* \* \* \* \*